UNITED STATES PATENT OFFICE.

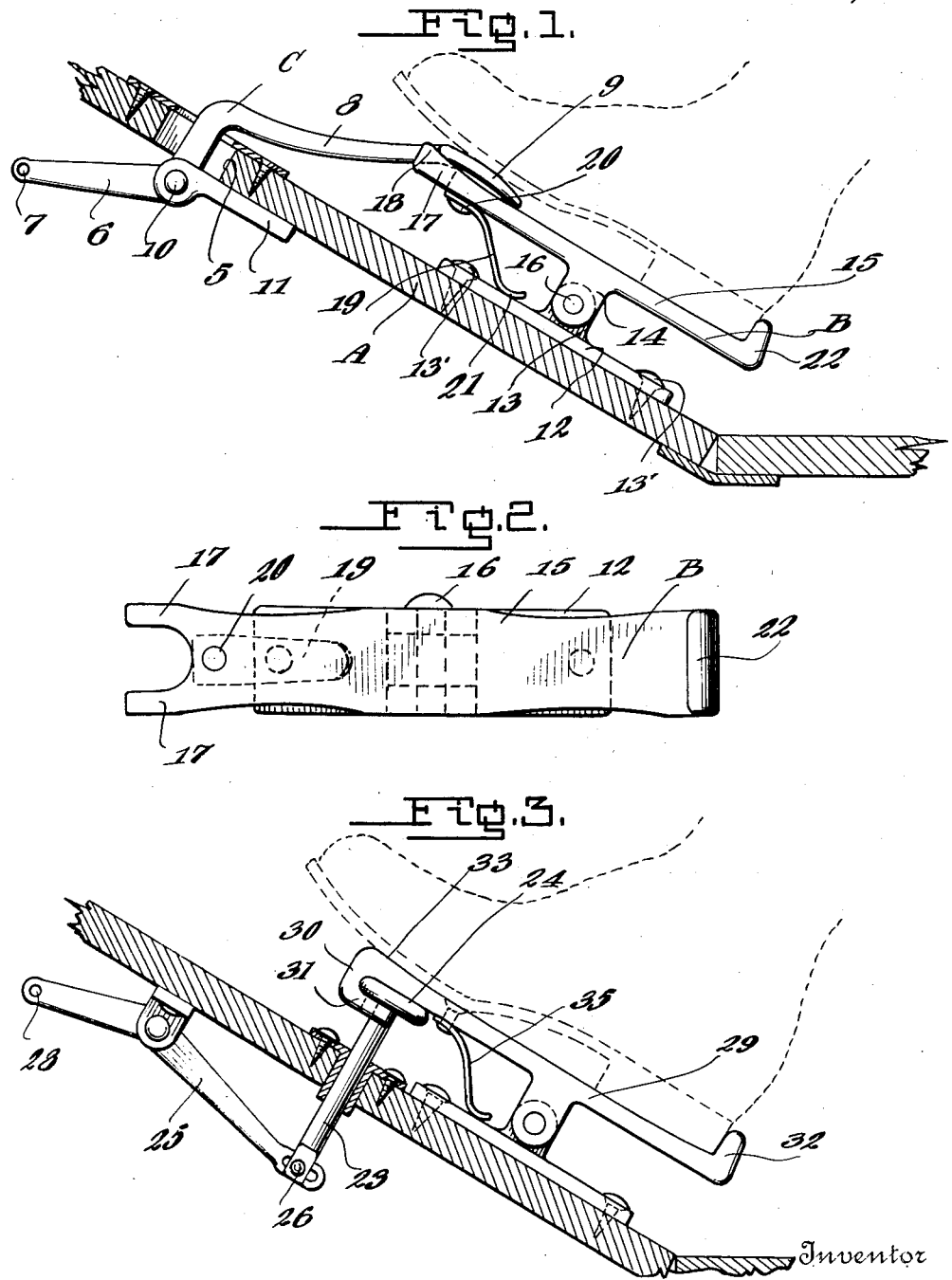

JOHN L. PAUL, OF AUVERGNE, ARKANSAS.

ACCELERATOR SAFETY PEDAL CONTROL.

1,403,443.  Specification of Letters Patent.  Patented Jan. 10, 1922.

Application filed May 3, 1920. Serial No. 378,501.

*To all whom it may concern:*

Be it known that I, JOHN L. PAUL, a citizen of the United States, residing at Auvergne, in the county of Jackson and State of Arkansas, have invented certain new and useful Improvements in Accelerator Safety Pedal Controls, of which the following is a specification.

This invention relates to means for operating accelerators for motor vehicles but which is susceptible of other uses, and the primary object of the invention is the provision of an improved device for operating accelerators embodying means for insuring the return of the accelerator to its normal position after actuation, thereby preventing accidents caused by the sticking or hanging of the accelerator switch lever or stem.

Another object of the invention is the provision of a foot pedal pivotally carried by the floor boards of a motor vehicle having an improved means for positively engaging the foot lever or stem of an accelerator, the pedal forming a foot rest for the operator of the vehicle and embodying spring means for holding the same in its raised position and for returning the accelerator lever or stem to its normal position, the pedal being so arranged as to permit the forcible returning of the accelerator lever or stem to its normal position when the spring means becomes inoperative for any reason or when the accelerator becomes jammed.

A still further object of the invention is the provision of an improved accelerator pedal of the above character, which is durable and efficient in use, one that is simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a fragmentary vertical transverse section through the floor board of a motor vehicle showing the improved pedal in operative position with an accelerator foot lever.

Figure 2 is a plan view of the improved pedal.

Figure 3 is a fragmentary detail vertical transverse section through the floor board of a motor vehicle illustrating a slightly modified form of foot pedal in operative engagement with the operating stem of an accelerator.

Referring to the drawings in detail, wherein similar reference characters designate like and corresponding parts throughout the several views, the letter A indicates the floor board of a motor vehicle; B the improved foot pedal and C the usual foot lever for an accelerator (not shown). The floor boards A may be arranged in any desired relation according to the construction of the motor vehicle and one of the same is provided with a slot 5, through which protrudes the lever C. The lever C is provided with a forwardly and downwardly projecting arm 6, the outer end of which carries an eye 7 for connection with a suitable part of an accelerator (not shown) and an upwardly and rearwardly projecting arm 8. The rear end 8 is provided with a circular head 9 so as to permit the same to be easily engaged by the foot of the operator. The lever C is pivoted intermediate its ends by means of a suitable pivot pin 10 to a bracket 11 which is secured to the lower face of the floor boards A.

The improved pedal B includes a base plate 12 which is bolted or otherwise secured as at 13 to the upper surface of the floor boards A directly in rear of the pedal B and the upper surface of the plate is provided intermediate its ends with an upstanding lug 13 which is adapted to be positioned between the depending spaced lugs 14 formed on the lower surface of the foot plate 15. The lugs 14 are carried by the central portion of the plate 15 and are pivotally connected to the lug 13 by means of a suitable pivot pin 16. The foot plate 15 is formed relatively long and extends beyond the terminals of the base plate 12 and the forward end of the same is fork shaped as at 17 for receiving the rear end of the arm 8 of the lever C in front of the circular head 9 and the forked terminal 17 is inclined slightly upwardly as at 18 for engaging the forward face of the circular head 9 so as to prevent accidental disengagement of the pedal B from the lever C. A leaf spring 19 is riveted or otherwise secured to the lower surface of the foot plate 15 as at 20 and extends downwardly toward the base plate 12 and the extreme lower end of the leaf spring 19 is provided with a curved foot 21 slidably engaging the upper surface of the base plate. The spring 19 normally tends to hold the upper end of the pedal in a raised position and thus hold the lever C in a normal position and the accelerator against actuation. The rear end of the plate 15 is provided with a heel piece 22 so as to prevent slipping of the operator's foot off of the foot plate 15.

In operation of the improved pedal, the operator's foot is placed upon the foot plate 15 as shown in dotted lines in Figure 1 with the toe portion of the foot on the circular head 9. When it is desired to actuate the accelerator, pressure is applied on the circular head 9 and the pedal is swung on its pivot 16 and the lever C depressed. This operates the accelerator and as soon as pressure is released from the circular head 9, the plate 15 will return to its normal position by the spring 19 and carry the lever C therewith. If the lever C becomes jammed in any manner and the spring 19 cannot return to its normal position, pressure can be applied to the foot plate 15 by the heel of the operator which will swing the foot plate on its pivot and raise the forward end of the foot plate and thus swing up on the lever C. This will forcibly return the lever to its normal position and absolutely prevent accident caused by the sticking of the accelerator lever.

In Figure 3 is shown a slightly modified form of the invention which is especially adapted to be used in connection with accelerators embodying a sliding stem 23 which is provided with a flat or disc shaped head 24. The lower end of the stem 23 can be connected to the usual bell crank 25 in any preferred manner and as shown the same is connected thereto by means of a pin and slot connection 26. The forward end of the bell crank lever 25 is provided with an eye 28 for connection with suitable parts of the accelerator (not shown). In this form, a foot plate 29 is provided, the extreme lower end of which is provided with a depending extension 30, which carries an inwardly extending forked member 31 which extends in spaced parallel relation to the foot plate 29. The head 24 of the stem 26 is adapted to fit between the lower surface of the foot plate 29 and the fork 31 and the fork 31 is adapted to engage around the stem 23. The foot plate 29 in this instance is also provided with a heel plate 32 so as to prevent the slipping of the foot of the operator on the plate. The upper surface of the plate 29 adjacent to its forward end is also slightly inclined upwardly as at 33 so as to prevent the slipping of the operator's foot forwardly on the plate. The plate 29 in this instance is also urged upwardly by means of a spring 35, which is similar to the spring 19. This type of pedal is operated exactly like the form shown in Figure 1 and the stem 23 can be forcibly returned to its normal position in case the spring 35 becomes broken or is not strong enough to return the stem to its correct position after actuation in case the same sticks or hangs.

From the foregoing description it can be seen that an improved type of foot pedal is provided for association with the foot levers or stems of accelerators for facilitating the operation thereof and for permitting the positive returning thereof to their normal positions in case the same become jammed.

Changes in details may be made without departing from the spirit or scope of my invention; but,

I claim:

1. An accelerator operating means comprising a base plate, a foot plate pivotally secured to the base plate intermediate its ends, and a forked terminal formed on the forward end of said base plate for positively and detachably engaging the operating member of an accelerator.

2. An accelerator operating means comprising a base plate, a foot plate pivotally secured to the base plate intermediate its ends, a heel plate formed on the lower end of the foot plate for preventing slipping of the foot of the operator off of said foot plate, a forked member formed on the opposite end of the foot plate and arranged to detachably engage the operating member of an accelerator, and spring means carried by the forward end of the foot plate for slidably engaging said base plate.

3. An accelerator operating means comprising a flat plate, an upstanding centrally disposed ear formed on the plate, a foot plate, depending ears carried by the central portion of the foot plate and arranged to engage the ear carried by the first mentioned plate, means pivotally connecting the ears together, a heel plate formed on the rear end of said foot plate, a forked member formed on the opposite end of the foot plate, a leaf spring secured to the lower surface of the foot plate in front of the pivot point thereof, and a curved lip formed on the lower end of said leaf spring and arranged to slidably engage the upper surface of the base plate.

4. The combination with an accelerator operating lever including an arm and a circular head formed on the arm, of an operating pedal therefor including a base plate adapted to be secured to the foot board of a motor vehicle in rear of the operating lever, a foot plate pivotally carried by the base plate intermediate its ends, a forked member formed on the end of said foot plate and arranged to engage the arm of said lever in rear of said circular head, the forked member being inclined upwardly for engaging said circular head, and spring means normally holding the forward end of the foot plate in engagement with the operating lever.

5. An accelerator operating mechanism comprising a foot plate pivotally mounted intermediate its ends, means carried by the forward end of the foot plate for detachably and positively engaging the lower surface of the operating member of an accelerator, and spring means arranged to engage the lower surface of the foot plate adjacent to its forward end for holding the forward end of the foot plate and the operating member of the accelerator in a raised position.

JOHN L. PAUL.